United States Patent [19]

Gerber et al.

[11] Patent Number: 5,425,087
[45] Date of Patent: Jun. 13, 1995

[54] TELEPHONE USAGE MONITORING ARRANGEMENT

[75] Inventors: Eugene Gerber, Bolingbrook; John H. Gustavson, North Aurora; Frank J. Olderr, Glenview; Mary R. Otto, Lisle; Wayne A. Senneke, Aurora; Donald R. Ziemann, Montgomery, all of Ill.

[73] Assignee: AT&T Corp., Murray Hill, N.J.

[21] Appl. No.: 286,898

[22] Filed: Aug. 8, 1994

Related U.S. Application Data

[63] Continuation of Ser. No. 906,622, Jun. 30, 1992.

[51] Int. Cl.⁶ .................. H04M 15/00; H04M 1/24
[52] U.S. Cl. ................................ 379/134; 379/113; 379/34
[58] Field of Search ............... 379/111, 113, 133, 134, 379/265, 266

[56] References Cited

U.S. PATENT DOCUMENTS 3,917,915  11/1975  Karras .................................. 379/133
4,510,351  4/1985   Costello et al. ..................... 179/27 D
4,656,656  4/1989   Mundy, Jr, et al. ................. 379/113
4,839,917  6/1989   Oliver ................................... 379/45
5,062,103  10/1991  Davidson et al. ................... 370/58.1
5,153,909  10/1992  Beckle et al. ....................... 379/265
5,159,698  10/1992  Harrington et al. ................. 379/112

FOREIGN PATENT DOCUMENTS 0376526  7/1990  European Pat. Off. ...... H04M 3/50

*Primary Examiner*—Stephen Chin
*Assistant Examiner*—Kevin Kim
*Attorney, Agent, or Firm*—Werner Ulrich

[57] ABSTRACT

This invention relates to real time accumulation of telephone usage data and real time reporting of such data to a telecommunications system administrator. Telephones being monitored are identified in translation information of the connected switching system. When a reportable event occurs for one of these telephones, a data message is sent to a management information system (MIS) for the group that includes that telephone, and the records of that MIS are updated and displayed. Advantageously, real time information is displayed for selected individual and/or group telephone stations.

22 Claims, 3 Drawing Sheets

FIG. 3

301
TELCOM MANAGER ENTERS SPECIFIC DATA REQUESTS TO MANAGEMENT INFORMATION SYSTEM

FIG. 4

401
TELCO SYSTEMS ADMINISTRATOR IDENTIFIES DIALED NUMBER AND EVENT LINK FOR MONITORED LINE

TELEPHONE USAGE MONITORING ARRANGEMENT

This application is a continuation of application Ser. No. 07/906,622, filed on Jun. 30, 1992.

TECHNICAL FIELD

This invention relates to the monitoring of telephone usage.

PROBLEM

A frequently encountered need in businesses is to monitor the telephone activities of employees. Such monitoring can be used to check the number and length of conversations, both with customers and with personal calls, the treatment of call waiting type calls, and the speed of answer of incoming calls.

Measurement of call activities is possible if the callers are members of an automatic call distributing (ACD) system. However, such systems are expensive and may have certain special requirements which are inconsistent with the types of individual service which a business may wish to monitor. For example, all members of an automatic call distributing group are members of one or more teams any of whose members can handle certain kinds of calls. This type of configuration is inconsistent with, for example, secretarial coverage arrangements and/or call forwarding arrangements, and, more generally, are not adapted for monitoring telephones in a business wherein most of the telephones have essentially private service.

Another arrangement which can be used to monitor telephone usage is the sent message detail recording system available from most telephone companies which reports on call holding times after a disconnect has been detected and which only reports measurements every thirty minutes. The delay is considered very undesirable by many businesses which prefer to give immediate feedback to their employees. Further, this arrangement only reports on calls completed and makes no report on attempts. Overall, the level of monitoring of this arrangement is not considered satisfactory for the needs of many businesses.

A third arrangement is a "hardware line monitor" unit, which uses customer premises equipment for monitoring the operations of telephones. The hardware line monitor outputs are used as inputs to a management information system (MIS) for subsequent processing. The hardware line monitor unit is both expensive and has the disadvantage that it only reports calls after a disconnect has been detected. Further, it does not report conditions such as hold, response to call waiting, conferences, or transfers, and cannot differentiate between local and toll calls.

Accordingly, a problem of the prior art is that there is no economical arrangement for monitoring of individual telephones having, for example, private or secretarial pickup service, in real time.

SOLUTION

This problem is solved and an advance is made over the prior art in accordance with our invention wherein any of a large class of call events is reported to a management information system of a telephone customer for real time data analysis and display. Whenever a call processing program of a switching system encounters one of the events which is to be reported to the management information system, a data message is sent to the management information system of the customer that owns the telephone being monitored. The events which may be monitored include dialing of an intra-centrex or outgoing call receiving an alerting signal (if possible along with an identification of the calling customer), the placement of the other party on hold or being placed on hold, and disconnect. Associated with each of these events is a time so that the management information system can calculate, for example, the length of each call, the length of time that a party was placed on hold, the telephone number of the other party (so that, for example, personal calls can be differentiated from business calls).

In accordance with one aspect of the invention, a line is monitored if the telephone company system's administrator transmits a message to the switching system identifying the directory number to be monitored and the data link over which information for that directory number is to be transmitted.

BRIEF DESCRIPTION OF THE DRAWING

FIGS. 2–4 are flow diagrams illustrating the methods of applicants' invention.

DETAILED DESCRIPTION

Figure 1:
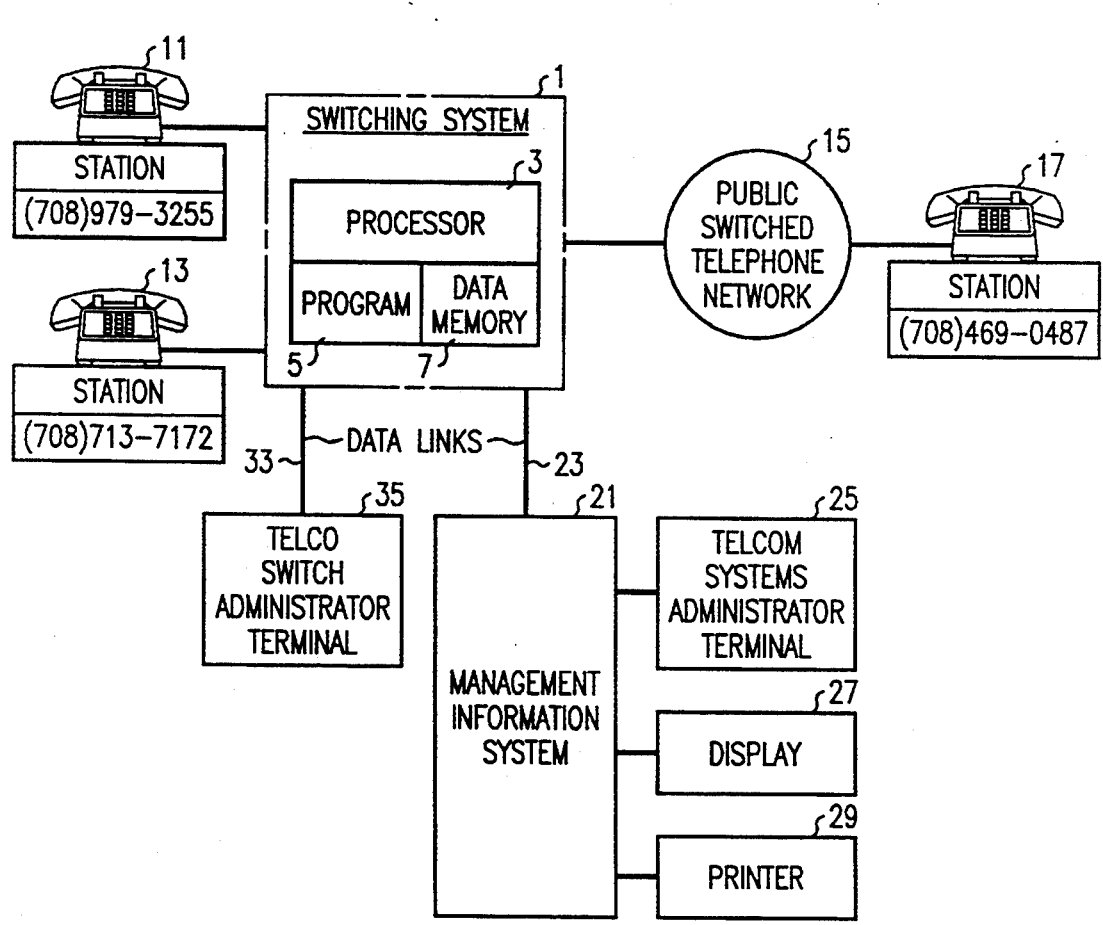
FIG. 1 is a block diagram illustrating the operation of applicants' invention.

FIG. 1 is a block diagram illustrating the operation of applicants' invention. Switching system 1 is a program controlled switching system such as AT&T's 5ESS® system described in *AT&T Technical Journal*, Vol. 64, No. 6, Part 2, July–August 1985, pages 1303–1564. The system is controlled by one or more processors 3 which include a program 5 to control the operation of the system and a data memory 7 to retain records of telephone call data and records of data for controlling individual telephones (translation data). Connected to the system are telephone stations 11 having a directory number 708 979-3255 and 13 having a directory number 708 713-7172. Stations 11 and 13 are part of a centrex group whose members can dial intra-centrex calls by dialing the last five digits of the directory number. These telephones also can access other telephones connected to switching system 1 and other telephones connected to other switching systems through the public switched telephone network 15 which is connected, for example, to telephone station 17, having directory number 708 469-0487. In addition, a management information system 21 for the customer who owns stations 11 and 13 is shown; this system is connected to the switching system 1 by data link 23. As will be seen from the discussion of the flow diagram of FIG. 2, actions by station 11 including calls to or from that station and including identification data for such calls are recorded in the data memory 7 under the control of program 5 and of translation data in data memory 7 for subsequent transmission via data link 23 to management information system 21.

If there is more than one data link, an interface unit accepts all messages from the processor 3 and distributes the messages to the appropriate data link 23 connected to the appropriate management information system 21. These data are then processed by the management information system 21 in a manner which is well known in the industry to generate displays and reports about the telephone usage characteristics of individual selected telephones and/or selected groups of such telephones. It is assumed in this case that telephone number 708 979-3255 has been singled out for special attention because of complaints about poor telephone manners and excessive personal calls.

The management information system (MIS) 21 is connected to a terminal 25 for use by the telecom systems administrator of the customer being served by the MIS, as well as a display 27 and printer 29 for displaying and printing the results of the MIS processing for the use of the telecom systems administrator and managers.

Figure 2:
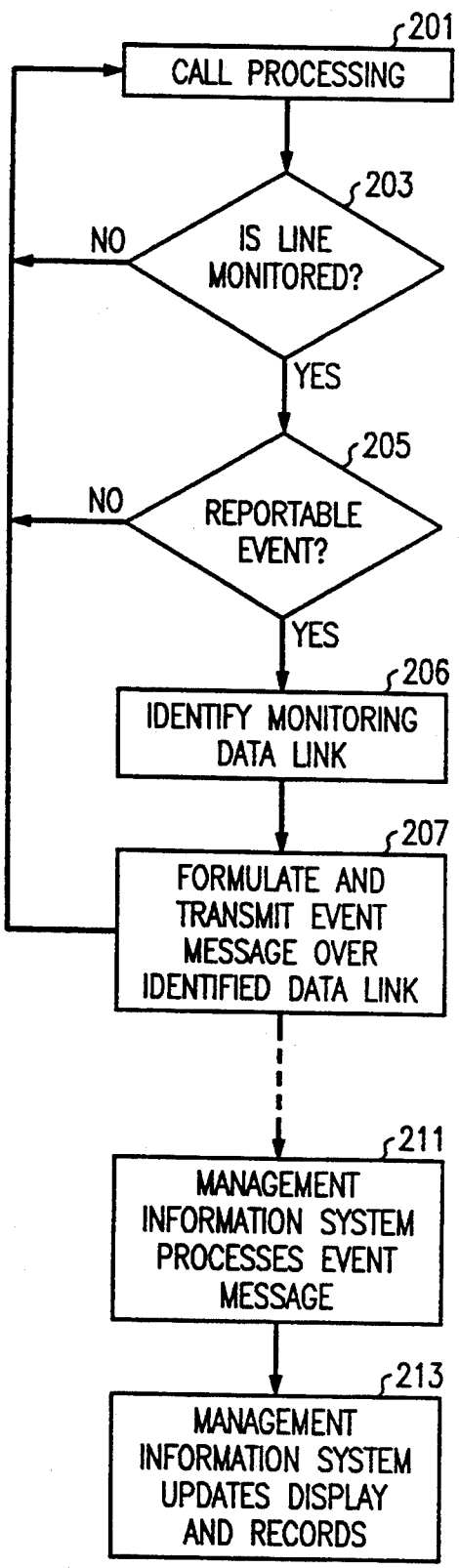

FIG. 2 is a flow diagram illustrating the processing required to implement applicants' invention. In the switching system 1, processor 3 is executing call processing programs (action block 201). Test 203 is executed to detect whether any of the telephones involved in the detected reportable events are being monitored and if so, over which data link should the reportable event be reported. If none of the telephones on the call are being so monitored, then call processing continues but if any of them are being so monitored, then following the detection of any significant call processing event, a test is made to see if this is a reportable event (test 203). If not, call processing is continued. If a reportable event is detected, action block 207 is used to formulate and control the transmission of an event message over the data link, identified in block 206, for each monitored line and call processing continues. In response to receipt of a transmitted event message, the management information system processes the event message (action block 211) and updates its display and records in accordance with the reported event.

The management information systems for processing call event data are well known in the prior art. An example of such a system is the Pinnacle ™ ACD/MIS available from AT&T. Such systems routinely offer facilities for real time monitoring based on the reported events of one or more individual telephone lines or one or more identified groups of such lines.

Block 301 (FIG. 3) illustrates the fact that a telecom systems administrator of a particular customer can enter specific data requests into the management information system to allow specific reports to be generated and/or specific data to be displayed dynamically. The administrator enters data using terminal 35 (FIG. 1) connected to switching system 1 by a data link 33. In some management information systems for larger customers, individual department telecom managers can access data relating to telephone lines in their departments from a central management information system for their own personal displays or report generators.

Block 401 (FIG. 4) illustrates that the telephone company switch administrator, whose terminal 25 is shown in FIG. 1 as connected via data link 33 to the switching system, identifies the directory number and event link for the monitored line. This identification is transmitted from the administrator's terminal to the switching system and is used to update data in data memory 7 so that when a significant call processing event takes place for that telephone, test 205 will indicate that the telephone is being monitored and will identify the data link over which the event is to be reported.

A typical scenario with an indication of reported events and information displayed is presented below. In this case it is assumed that the line being monitored is 708 979-3255. The telephones in the centrex of which stations 11 and 13 are members are ISDN stations. Perhaps the reason why this telephone was selected is that complaints have been received concerning the telephone manners of the user of this telephone and concerning excessive use of the telephone for personal calls. The discussed portion of the monitored period begins with the arrival of a intra-centrex call from centrex station 13. The reportable event is the alerting message, the time, the identification of the calling telephone, and the categorization of this call as an intra-centrex call. The next reportable event is answer for that call. Reporting of this event allows the MIS system to report delay in answering calls. This delay can be reported on an individual and/or an average basis. Sometime in the middle of the call, a second call is received for station 11 and station 11 puts the original call on hold. There are two reportable events here. First, the identification of the other call including the calling number, if available, and second the time at which the first call was placed on hold. Eventually, the second call is disconnected (another reportable event) and the first call is recalled from hold (another reportable event). These reports allow the management information system to calculate the length of time that the first call was put on hold (a possible explanation for the complaint about poor telephone manners) and the lapse of time between the disconnect of the second call and the recall of the first call from hold. The next reportable event is a disconnect of the first call which allows the system to calculate the total elapsed time of that first call. A next reportable event is an incoming call identified as coming over the public switched telephone network from telephone station 708 469-0487. It may well be apparent to the customer administrator that this number represents a personal call, especially if that number occurs frequently. The reportable events in this case are the alerting signal and time including the identity of the caller, and the answer time (indicating delay to answer of telephone calls). The next reportable event for this simple third call is the disconnect time. The information that can be calculated from this disconnect time by the management information system is the length of time of that personal call.

From the above, it will be obvious to those of ordinary skill in the art that applicants' invention has flexibility for gathering large quantities of useful data concerning telephone usage patterns of one or more selected lines or line groups for subsequent analysis by a separate management information system. Note that the switching system may be a private branch exchange (PBX) as well as a central office.

The order of detection of reportable events and decision of whether an event is for a monitored line may be made according to the convenience of a particular implementation and may be different for different kinds of reportable events.

A monitored line can request monitoring of specific events by entering digits identifying, for example, a customer account number. The corresponding report can then summarize call activities and duration for calls related to that customer account.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of monitoring telephone usage in real time comprising the steps of:

in a telephone switching system, comprising a control processor for controlling establishment of calls, for serving calls from a plurality of telephone lines directly connected to said switching system, establishing a call from or to one of said lines;

entering data for identifying telephone lines to be observed into the control processor;

in the control processor, detecting a reportable telephone call event on one of said lines;

in said switching system, testing whether the telephone line on which the reportable event occurred is being observed;

if said telephone line is being observed, identifying in said switching system a data link to a management information system for accumulating information for said telephone line;

reporting said reportable event for said telephone line to said management information system from said switching system over said data link; and in said management information system, responsive to the step of reporting, updating records for said telephone line and recording time information for ones of the reportable events for generating displayed or printed reports in real time.

2. The method of claim 1 wherein said testing step comprises testing whether data, said data for identifying said telephone line, was entered into said telephone switching system for detecting one of said plurality of reportable telephone call events, further comprising:

entering data, for identifying telephone lines to be monitored, from a telephone company systems administrator terminal into said switching system.

3. The method of claim 2 wherein a plurality of data links connect said telephone switching system with management information systems, further comprising:

entering information for specifying the data link identified in the identifying step, for reporting reportable events for a telephone line identified from said telephone company systems administrator terminal.

4. The method of claim 1 further comprising:

controlling the updating step by entering specific data requests into said management information system from a telecommunications manager terminal for said management information system.

5. The method of claim 1 wherein said reportable telephone call events include placing a call on hold.

6. The method of claim 1 wherein said reportable telephone call events include time when a telephone is alerted and time when a telephone is answered.

7. The method of claim 1 wherein said reportable telephone call events include initiating or joining a conference.

8. The method of claim 1 wherein said reportable telephone call events include transferring a call.

9. The method of claim 1 wherein said reportable telephone call events include a disconnect.

10. The method of claim 1 wherein said reportable telephone call event for said telephone line is an event related to one of several calls being simultaneously processed for said telephone line.

11. The method of claim 1 wherein said reportable telephone call events include a call origination.

12. The method of claim 1 wherein said reportable telephone call events include an event specified by identifying data entered from a monitored telephone line.

13. A telecommunications system comprising:

a switching system, for serving calls from a plurality of telephone lines connected to said switching system, comprising processor means for controlling said switching system;

at least one management information system (MIS) connected to said switching system by a data link, for accumulating and reporting information regarding telephone usage;

said processor means comprising memory for identifying ones of said plurality of telephone lines being observed;

said processor means operative under program control for: detecting reportable telephone call events on ones of said lines being observed;

identifying a data link corresponding to a MIS for accumulating information for a telephone line for which a reportable event has been detected; and formulating and transmitting over said data link a message reporting said reportable event;

said MIS responsive to said message for updating and reporting information regarding telephone usage including time lapse information for consecutive ones of said telephone call events for said line in real time.

14. The system of claim 13 wherein said reportable telephone call events include placing a call on hold.

15. The system of claim 13 wherein said reportable telephone call events include time when a telephone is alerted and time when a telephone is answered.

16. The system of claim 13 wherein said reportable telephone call events include initiating or joining a conference.

17. The system of claim 13 wherein said reportable telephone call events include transferring a call.

18. The system of claim 13 wherein said reportable telephone call events include a disconnect.

19. The system of claim 13 wherein said reportable telephone call events include events for one telephone line related to any of several calls being simultaneously processed for that one telephone line.

20. The system of claim 13 wherein said reportable telephone call events include a call origination.

21. The system of claim 13 wherein said reportable telephone call events include an event specified by identifying data entered from a monitored telephone line.

22. The system of claim 13 wherein said system is responsive to data receivable over a data link for entering data into said memory for identifying telephone lines to be observed.

* * * * *

UNITED STATES PATENT AND TRADEMARK OFFICE
CERTIFICATE OF CORRECTION

PATENT NO. : 5,425,087

DATED : June 13, 1995

INVENTOR(S) : Eugene Gerber, John H. Gustavson, Frank J. Olderr, Mary R. Otto, Wayne A. Senneke, Donald R. Ziemann It is certified that error appears in the above-identified patent and that said Letters Patent is hereby corrected as shown below:

Column 5, claim 2, line 31, change "monitored" to --observed--.

Column 6, claim 12, line 7, change "a monitored" to --an observed--.

Column 6, line 21, line 54, change "a monitored" to --an observed--.

Signed and Sealed this

Tenth Day of October, 1995

Attest:

BRUCE LEHMAN

Attesting Officer

Commissioner of Patents and Trademarks